(12) United States Patent
Posamentier

(10) Patent No.: US 7,724,136 B2
(45) Date of Patent: May 25, 2010

(54) REVEALABLE RFID DEVICES

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 11/544,491

(22) Filed: Oct. 5, 2006

(65) Prior Publication Data

US 2008/0084309 A1 Apr. 10, 2008

(51) Int. Cl.
*G08B 13/14* (2006.01)
(52) U.S. Cl. ............ 340/572.1; 340/572.3; 340/572.7; 340/572.8; 343/700 R; 429/19; 429/20
(58) Field of Classification Search ............ 340/572.1, 340/572.7, 572.8, 539.1, 539.15, 10.1, 10.5, 340/572.3; 343/842; 429/19, 20
See application file for complete search history.

(56) References Cited

U.S. PATENT DOCUMENTS 5,495,250 A * 2/1996 Ghaem et al. ............ 342/51
5,512,879 A * 4/1996 Stokes ............ 340/573.4
6,814,284 B2 * 11/2004 Ehlers et al. ............ 235/383
7,253,734 B2 * 8/2007 Moskowitz ............ 340/572.3
7,277,016 B2 * 10/2007 Moskowitz et al. ...... 340/572.3
7,397,378 B1 * 7/2008 Leason ............ 340/572.7

OTHER PUBLICATIONS

BAARD Nov. 18, 2003—Is RFID Technology Easy to Foil?—Wired News—http://www.wired.com/news/privacy/0,1848,61264,00.html.
RFID Shield—printed Oct. 4, 2006—http://www.rfid-shield.com/products.php.

* cited by examiner

*Primary Examiner*—Davetta W Goins
(74) *Attorney, Agent, or Firm*—Schwegman, Lundberg & Woessner, P.A.

(57) ABSTRACT

The antenna of a radio frequency identification (RFID) tag may be detuned by applying a conductive material in radio frequency (RF) contact with the antenna, such that the RFID tag is not operable. This material may later be removed, or the conductive effect of the material eliminated, thus re-tuning the antenna to its design specifications and restoring the RFID tag to an operable condition. In this manner, RFID tags may be manufactured in an inoperable state, to be subsequently made operable through the occurrence of an event, such as scraping off the conductive material.

7 Claims, 3 Drawing Sheets

REVEALABLE RFID DEVICES

BACKGROUND

Radio frequency identification (RFID) technology has been increasingly used for inventory control purposes, and is finding its way into many other applications as well. Concern over privacy considerations has spurred the development of techniques to permanently disable an operational RFID tag after a certain event has occurred (for example, after a tagged product has been sold to the consumer). However, there are some applications in which it may be desirable to not activate the RFID tag until after a particular event occurs. Such applications may include circumstances in which the RFID tag's information should be protected from surreptitious reading until after the tagged device has been purchased or otherwise authorized. Some examples might be secure key distribution, retail gift cards, lottery tickets, etc.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1B:
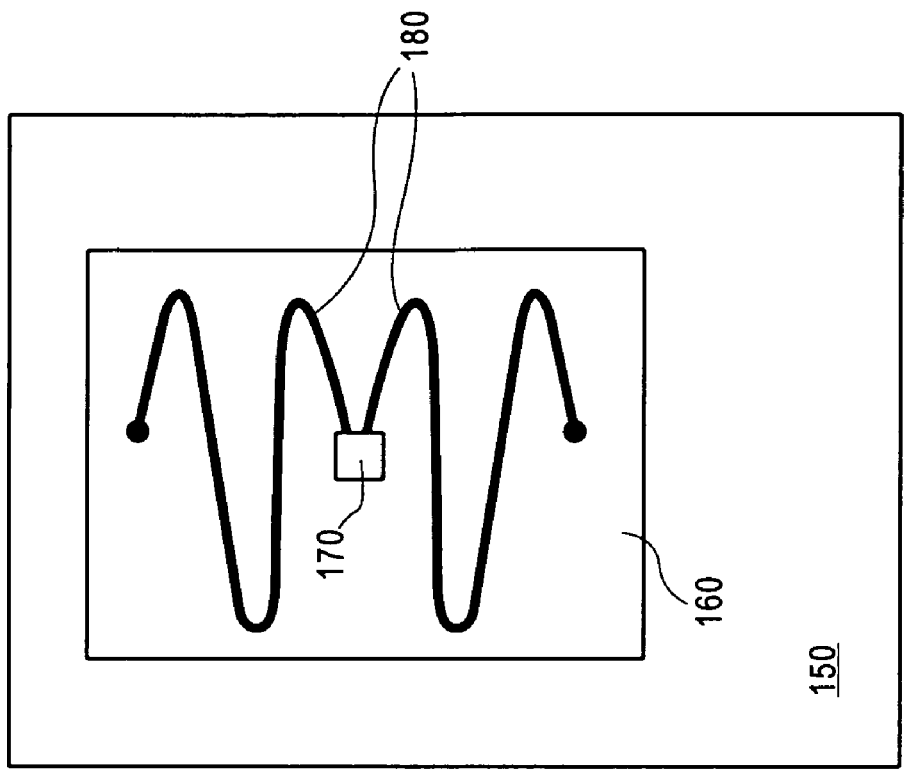
FIGS. 1A and 1B show diagrams of objects containing revealable RFID tags, according to various embodiments of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" indicates that two or more elements are in direct physical or electrical contact with each other. "Coupled" indicates that two or more elements cooperate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Within the context of this document, an RFID tag (sometimes referred to as an RFID transponder) is defined as comprising an RFID antenna (to receive an incoming wireless signal that serves to activate the RFID tag, and to transmit a wireless response in the form of a modulated radio frequency signal), and an RFID tag circuit (which may include circuitry to store an identification code for the RFID tag, circuitry to transmit that code through the antenna, and in some embodiments a power circuit to collect received energy from the incoming radio frequency signal and use some of that energy to power the operations of the RFID tag circuit). As is known in the field of RFID technology, "transmitting" a signal from an RFID tag may include either: 1) providing sufficient power to the antenna to generate a signal that radiates out from the antenna, or 2) reflecting a modulated version of the received signal. Within the context of this document, an RFID reader may be a device that wirelessly transmits a signal to the RFID tag to cause the RFID tag to wirelessly transmit the aforementioned response, which may be received by the RFID reader to identify the RFID tag. A 'passive RFID tag' is an RFID tag that obtains its operating power by harvesting energy from the radio frequency signal received through its antenna, while an 'active RFID tag' is an RFID tag that obtains its operating power by being connected to a battery or other physically tangible power source (e.g., a power supply).

Various embodiments of the invention may use a conductive material in sufficient close proximity to the antenna of an RFID tag, to sufficiently 'de-tune' the antenna so that the RFID tag will effectively be inoperable. The material should either be in electrical contact with the antenna, or located so close to the antenna that it appears to be in electrical contact at RF frequencies and the material therefore effectively becomes a part of the antenna. Such proximity is referred to herein as being in 'RF contact' with the antenna. When the material is removed, or the conductive nature of the material is negated, this de-tuning effect will also be removed, so that the RFID tag may then operate as it was designed to do. RF contact may be achieved through various means, such as but not limited to covering the antenna with a thin insulating material (e.g., approximately 0.001 inches thick for 900 MHz operation) before attaching the conductive material over the insulating material. This insulating material may protect the antenna from oxidation (since the antenna won't be exposed to the air) and may also protect the antenna from physical damage that might otherwise be caused when the conductive material is removed.

Figure 1A:
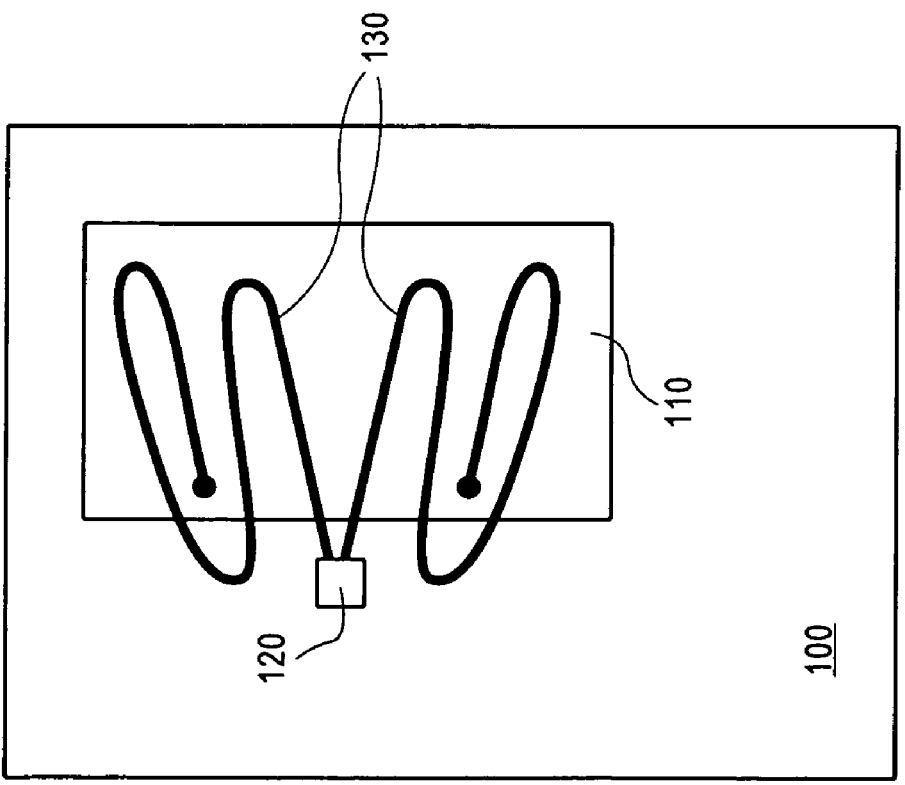

FIGS. 1A and 1B show objects containing revealable RFID tags, according to various embodiments of the invention. In the illustrated embodiment of FIG. 1A, an RFID tag consists of an RFID tag circuit 120 connected to an RFID antenna 130, both of which are disposed on an object 100. The configuration and dimensions of the antenna may be chosen so that the RFID tag will operate relatively efficiently at frequencies at which the RFID tag is intended to operate. A conductive material 110 is disposed over part of the antenna so that the conductive material is in RF contact with the antenna, and from an operating perspective it may therefore become a part of the antenna. In some embodiments the conductive material has a planar shape that is deposited over the surface of the object and the antenna. For clarity of illustration, the conductive material is shown as transparent in the drawings (i.e., the antenna is still visible), but other embodiments may use other techniques, such as an opaque or translucent conductive material. Because the conductive material has a much greater area and much different shape than the antenna, and is in RF contact with the antenna, it may greatly change the operating characteristics of the antenna so that the RFID tag will no longer operate at the intended frequencies.

FIG. 1B is similar to FIG. 1A, but it shows a conductive material 160 that completely covers the entire RFID tag (both antenna 180 and RFID tag circuit 170) all of these disposed on an object 150. Other embodiments may have other degrees of coverage, such as: 1) the conductive material covers all of the antenna but doesn't cover the RFID tag circuit, 2) the conductive material covers part of the antenna and part of the RFID tag circuit, 3) etc. The amount and shape of this coverage may be chosen for various reasons, such as but not limited to: 1) the effect it has on the operating characteristics of the antenna, 2) potential damage that may occur to the antenna and/or the RFID tag circuit when the conductive material is later removed or its conductiveness is reduced, 3) the cost and/or difficulty of applying the conductive material to the object and/or removing the conductive material from the object, 4) etc. The shapes of the antennas shown in the drawings are for clarity of illustration only—actual antennas may have any feasible shape and/or size.

When the conductive material (e.g., 110 or 160) is later removed, the original operating characteristics of the antenna may be restored, and the RFID tag may then operate as it was intended to operate. In this manner, the RFID tag may be initially disabled by applying the conductive material (e.g., at the manufacturer), and then later enabled for subsequent operation by removing the material or otherwise negating the conductiveness of the material. When the RFID tag is thus enabled, it may be considered to be 'revealed' to a nearby RFID reader that is polling for RFID tags, whereas the RFID tag would not have been detectable by the RFID reader prior to being enabled. In some embodiments the manner of removing or negating the conductive effects of the material may be irreversible, so that once the RFID tag is revealed, the removal/negation process cannot be reversed.

Although the conductive material itself may have various implementations, some common characteristics of all these implementations are that 1) the conductive material has such a configuration, and has sufficient RF contact with the antenna, that it effectively makes the RFID tag inoperative by detuning the antenna, and 2) the material may be removed, or its conductive effects negated, in a manner that places the RFID tag in an operable condition. This differs from some conventional implementations that simply shield the antenna by placing a metal material around the antenna, but do not de-tune the antenna by placing a conductive material in RF contact with the antenna.

Figure 2B:
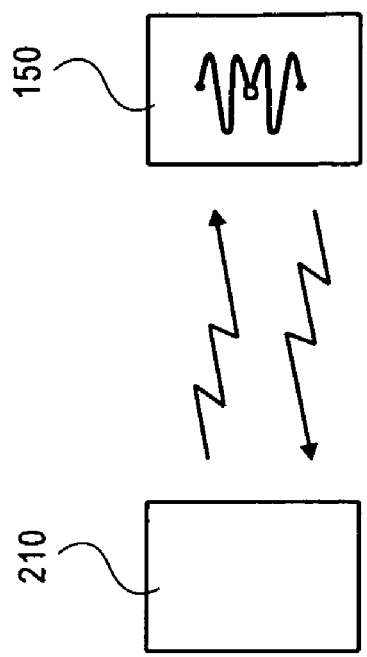
FIGS. 2A and 2B show diagrams of an RFID reader trying to communicate with an RFID tag before and after removal of a conductive material from the RFID tag's antenna, according to an embodiment of the invention.
Figure 2A:
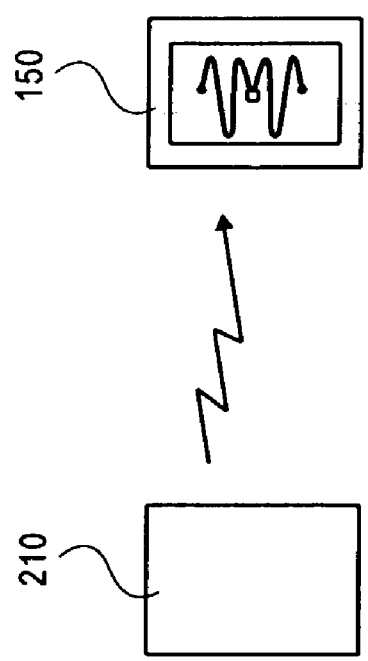

FIGS. 2A and 2B show a diagram of an RFID reader trying to communicate with an RFID tag before and after removal of a conductive material from the antenna, according to an embodiment of the invention. In the illustrated embodiment of FIG. 2A, an RFID reader 210 transmits a wireless signal to activate any compatible RFID tags within its operating range, such as the RFID tag on object 150. However, since object 150 has a conductive material in RF contact with the antenna of its RFID tag, the RFID tag does not respond. This may be because 1) the conductive material detunes the RFID tag antenna sufficiently that the RFID tag circuit does not receive enough energy to become activated, or 2) the RFID tag can become activated, but the conductive material detunes the RFID tag antenna sufficiently that the response is too weak or is at the wrong frequency to be detected by the RFID reader.

FIG. 2B shows the same RFID reader 210 and object 150, but in this instance the conductive material has been removed from the RFID tag antenna so that the RFID tag is operable. The RFID tag may now respond to the wireless signal from the RFID reader by transmitting a recognizable response back to the RFID reader 210.

Figure 3:
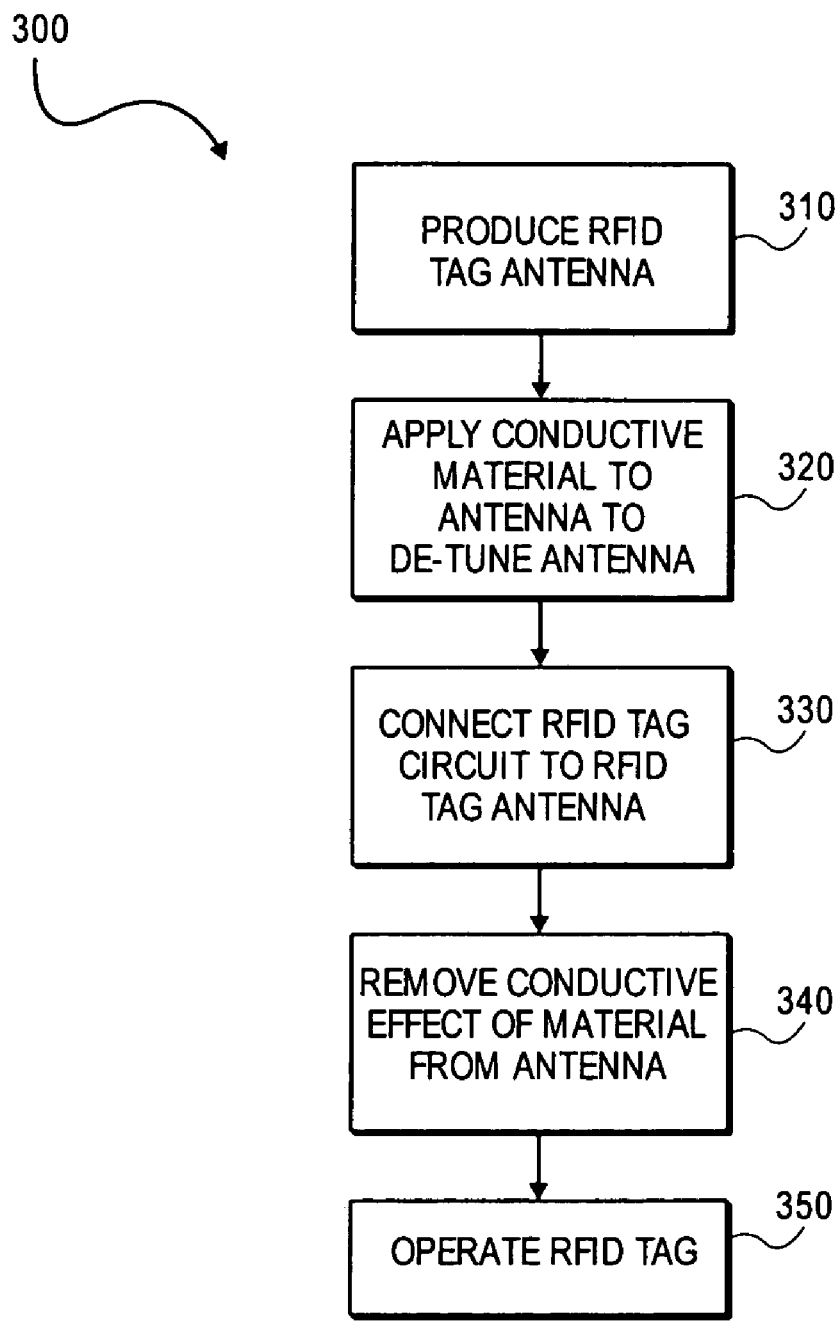
FIG. 3 shows a flow diagram of a method of applying and removing a conductive material to an RFID tag antenna.

FIG. 3 shows a flow diagram of a method of applying and removing a conductive material to an RFID tag antenna. In the embodiment of flow diagram 300, at 310 an RFID tag antenna is produced. The operation of 'producing' may take any of various forms, such as but not limited to: 1) manufacturing the antenna, 2) providing an antenna that has already been manufactured, 3) etc. In various embodiments the antenna may be produced by itself, it may be produced on a substrate or other support structure, it may be produced already connected to an RFID tag, or it may be produced through any combination of these operations and/or other operations.

At 320 a conductive material may be placed in RF contact with the antenna in a manner that de-tunes that antenna so that the RFID tag effectively won't operate at the frequencies for which it was designed, and in some embodiments may not operate at any feasible frequency. In some embodiments the conductive material may also be applied over the RFID tag circuit, if that circuit is already attached to the antenna, but other embodiments may not be so limited. The operation of applying may involve applying the material directly to the surface of an object on which the antenna is disposed, so that the object provides a surface to support the material and also to support the antenna. The manner of application may comprise any suitable technique, such as but not limited to: 1) sputter deposition of a conductive substance, 2) printing of a conductive ink, 3) attachment of a conductive label, 4) etc. The RFID tag circuit (if in place at the time) may be covered with an insulating material so that any of the conductive material that might be left after removal will not short out the circuitry.

The object itself may also take any suitable form, such as but not limited to: 1) a paper or cardboard ticket, 2) a plastic or other non-conductive substrate, 3) a container to house other objects, 4) etc. At 330, the RFID tag circuit may be connected to the antenna, if those two items are not already attached. At this point, the combination of object, RFID tag, and conductive material may be complete so that the combination, with or without further manufacturing operations, may be placed into the stream of commerce, and the RFID tag will not respond to a poll from an RFID reader.

At a later time, when the RFID tag is to be enabled, the conductive effects of the conductive material may be removed at 340. This may be accomplished in either of two ways: 1) by physically removing the conductive material from the antenna, or 2) by negating the conductiveness of the material so that the material no longer de-tunes the RFID antenna. Physically removing the material may be accomplished in various ways, such as but not limited to: 1) scratching or scraping off the conductive material (e.g., as is commonly done with scratch-off lottery tickets), 2) dissolving the material in a liquid such as water or a chemical, 3) peeling the material off (e.g., in the case of a removable conductive label), 4) melting the material until it is removed, or 5) any combination of these and/or other techniques. Negating the conductiveness of the material (i.e., reducing the conductiveness of the material until it no longer interferes with the operation of the RFID tag) may be accomplished in various ways, such as but not limited to: 1) treating the material with a chemical that reduces the conductiveness of the material, 2) heating the material in a way that reduces the conductiveness of the material, 3) exposing the material to a particular type of electromagnetic radiation that reduces the conductiveness of the material, 4) any combination of these and/or other techniques. Once the conductive effects of the material have been removed at 340, the RFID tag may be operable, and may operate in its intended manner at 350 by detecting and responding to wireless polls that have the correct characteristics.

The techniques described herein may be used in various types of applications. Following is a list of examples, though this list should not be interpreted as a limitation on the types of applications that may benefit from these techniques:

1) Scratch-off lottery tickets. Tickets may be read by an RFID reader, but the identification code in the ticket's RFID tag cannot be read (and therefore a winning ticket can't be located) until the consumer purchases the ticket and scratches off the conductive coating.

2) Gift cards, phone cards, and other cards for retail purchases. The card will not be enabled until the conductive coating is removed. Prior to such activation, the ID number of the card cannot be read by a hacker and therefore can't be placed into a counterfeit card.

3) Secure keys for trusted communications. These may be encoded in the RFID tag and subsequently transferred to a communications device after the conductive material is removed upon receipt of the tag. But as long as that conductive material is intact, the keys cannot be surreptitiously read while the tag is in transit.

4) Environmental monitors. These may use a material whose conductiveness is degraded by exposure to the measured environmental condition. Once the threshold exposure amount has been surpassed, the conductiveness of the material will be reduced sufficiently to enable the RFID tag to respond to an RFID reader, and the presence of that response may trigger an associated alarm in the RFID reader or an associated computer system. For example, exposure to flowing water may cause the conductive material to dissolve and wash away, thus enabling the RFID tag to report a flash flood, or a certain level of snow melt, or a leak in a boat. Exposure to a certain amount of radiation (gamma rays, X-rays, ultraviolet, infra-red, etc.) may cause the conductive material to lose its conductiveness, thus enabling the RFID tag to report that the exposure has exceeded predetermined levels. Exposure to temperatures that surpass the melting point of the conductive material may cause the material to melt away, thus enabling the RFID tag to report that the threshold temperature has been exceeded. Exposure to specific chemical fumes may cause the material to dissolve or lose its conductiveness, thus enabling the RFID tag to report such exposure. Other examples are also possible.

Some of the described embodiments may represent irreversible enablement, with 'irreversible' meaning that once a condition is achieved that enables the tag, the tag will remain enabled because the material's conductiveness does not return even if the enabling condition does not remain.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising:
   an antenna to be connected to a radio frequency identification (REID) tag circuit, the antenna configured to operate at a particular frequency; and
   an electrically conductive material in radio frequency (RE) contact with the antenna to prevent the antenna and connected REID tag circuit from operating at the particular frequency until a conductive effect of the material is removed by reducing the conductivity of the electrically conductive material.

2. The apparatus of claim 1, wherein the material has a planar shape.

3. The apparatus of claim 1, wherein said reducing the conductivity of the electrically conductive material comprises an operation selected from a list of operations consisting of 1) reducing conductivity of the material with a chemical, 2) reducing conductivity of the electrically conductive material by exposing the electrically conductive material to a particular type of electromagnetic radiation, and 3) reducing conductivity of the electrically conductive material by heating the electrically conductive material.

4. The apparatus of claim 1, further comprising the RFID tag circuit electrically connected to the antenna.

5. The apparatus of claim 4, further comprising an object coupled to the RFID tag circuit, the object to be identified by transmitting an identification code in the RFID tag circuit through the antenna.

6. A method, comprising:
   providing a radio frequency identification (RFID) tag having an electrically conductive material in RF contact with an antenna of the RFID tag, such that the electrically conductive material prevents the RFID tag from being operable; and
   removing a conductive effect of the electrically conductive material by changing the conductivity of the electrically conductive material to an electrically nonconductive characteristic, such that the RFID tag becomes operable.

7. The method of claim 6, wherein said changing comprises an operation selected from a list of operations consisting of: 1) heating the electrically conductive material, 2) chemically treating the electrically conductive material, and 3) treating the electrically conductive material with electromagnetic radiation.

* * * * *

UNITED STATES PATENT AND TRADEMARK OFFICE
CERTIFICATE OF CORRECTION

| | | |
|---|---|---|
| PATENT NO. | : 7,724,136 B2 | Page 1 of 1 |
| APPLICATION NO. | : 11/544491 | |
| DATED | : May 25, 2010 | |
| INVENTOR(S) | : Joshua Posamentier | |

It is certified that error appears in the above-identified patent and that said Letters Patent is hereby corrected as shown below:

In column 6, line 14, in Claim 1, delete "(REID)" and insert -- (RFID) --, therefor.

In column 6, line 16, in Claim 1, delete "(RE)" and insert -- (RF) --, therefor.

In column 6, line 18, in Claim 1, delete "REID" and insert -- RFID --, therefor.

Signed and Sealed this

Third Day of August, 2010

David J. Kappos
*Director of the United States Patent and Trademark Office*